C. H. WILLIAMS.
SAFETY HANGER FOR BRAKE RODS.
APPLICATION FILED JULY 13, 1916.
1,199,956.
Patented Oct. 3, 1916.
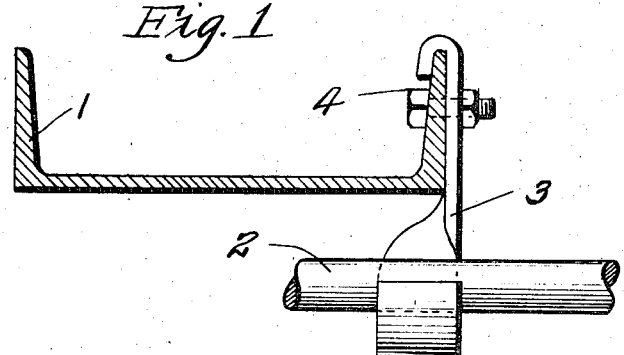
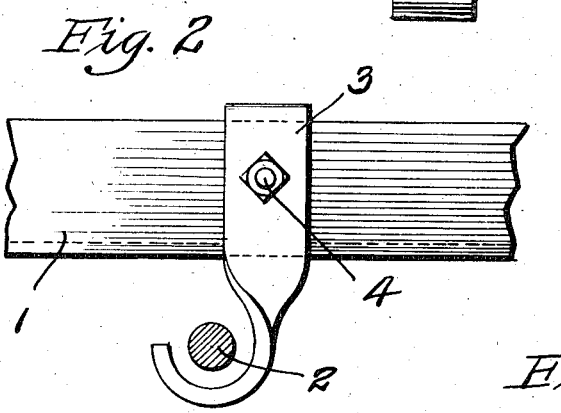
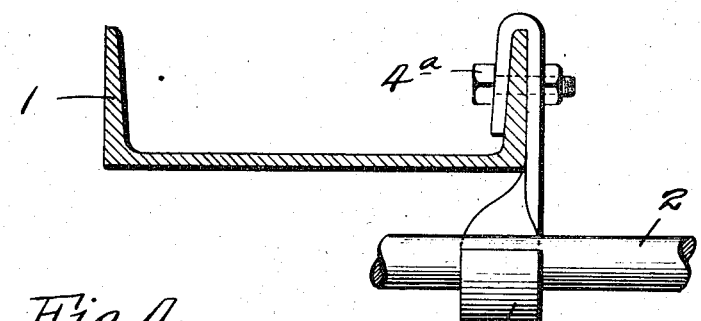
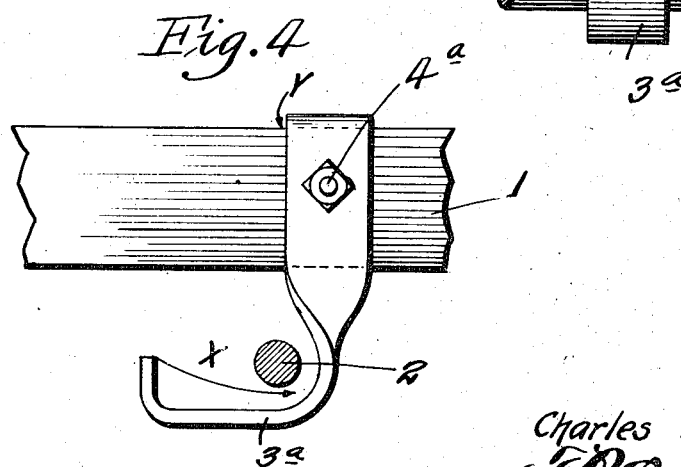
Inventor
Charles Haines Williams
By F. R. Cornwall, Atty.

UNITED STATES PATENT OFFICE.

CHARLES HAINES WILLIAMS, OF CHICAGO, ILLINOIS, ASSIGNOR TO CHICAGO RAILWAY EQUIPMENT COMPANY, OF CHICAGO, ILLINOIS, A CORPORATION OF ILLINOIS.

SAFETY-HANGER FOR BRAKE-RODS.

1,199,956.   Specification of Letters Patent.   Patented Oct. 3, 1916.

Application filed July 13, 1916. Serial No. 109,141.

*To all whom it may concern:*

Be it known that I, CHARLES HAINES WILLIAMS, a citizen of the United States, residing at the city of Chicago, county of Cook, State of Illinois, have invented a certain new and useful Improvement in Safety-Hangers for Brake-Rods, of which the following is a full, clear, and exact description, such as will enable others skilled in the art to which it appertains to make and use the same, reference being had to the accompanying drawings, forming part of this specification, in which—

Figure 1 is a side elevational view of my improved safety hanger for brake rods. Fig. 2 is an end elevational view of the same. Fig. 3 is a side elevational view of a modified form. Fig. 4 is an end elevational view of the form shown in Fig. 3.

This invention relates to a new and useful improvement in safety hangers for brake rods and is particularly adapted for use in connection with what is known as the bottom connection rod of the brake beam. Heretofore, safety hangers for this rod in the form of U-shaped stirrups or loops have been employed, the legs of said stirrups or loops being riveted to the spring plank or some other part of the truck. By being thus fixed in position and entirely embracing the rod repairs were rendered difficult, especially where the removal of the rod such as by unfastening and dropping one end thereof, was desired. By the use of my present invention, the safety hanger does not entirely embrace the rod and therefore can be slid or swung out of position so as to enable the rod to be dropped, or entirely removed in case of repairs; said safety hanger, however, when in operative position lying under the rod so as to catch the same and support it in case of accidental disconnection at either end thereof when in service.

In the drawing 1 indicates part of the car truck, in this instance the spring plank.

2 is the bottom connection rod which, in many types of trucks, passes under the spring plank and is connected to parts of the brake mechanism at each end.

3 is the safety hanger preferably in the form of a flat plate or bar whose upper end is bent to engage a flange of the spring plank and whose lower end is bent to partially embrace the bottom connection rod. This hanger is held in position by a removable nut and bolt 4, and if desired, the nut may be held against accidental displacement by use of a cotter pin.

In operation the hanger is normally in the position shown in Fig. 2, but in case of repairs the nut and bolt may be quickly removed permitting the tilting and sliding of the safety clamp along the flange of the spring plank in a direction away from the connection rod. Of course after repairs are made the safety clamp is moved back to position and secured in place.

In Figs. 3 and 4, I have shown a modified form in which the bottom leg $3^a$ of the safety clamp is elongated and when it is desired to drop the connection rod, the securing bolt and nut $4^a$ is removed and the clamp swung in the direction of the arrow X, the clamp pivoting at Y on the flange of the spring plank.

While I have shown the safety hangers being made of bars twisted and bent into shape, it is obvious that castings, or other forms, could be used.

I claim:

1. A safety hanger for parts of brake rigging comprising a member partially embracing the part to be protected, said safety hanger being detachably secured in position to a part of the car truck and having a relative movement on said part of the car truck when its securing means is removed.

2. The combination with a part of a car truck, of a safety hanger mounted thereon, a removable fastening device for securing said safety hanger in operative position, said safety hanger being capable of movement relative to said part of the car truck upon which it is mounted, when said securing means is removed, whereby the part protected by the safety hanger is exposed and may be moved in a direction which said safety hanger normally prevents when in operative position.

In testimony whereof I hereunto affix my signature in the presence of two witnesses, this 7th day of July, 1916.

CHARLES HAINES WILLIAMS.

Witnesses:
 E. T. WALKER,
 M. F. HUNTOON.